United States Patent
Mimar

(10) Patent No.: US 7,506,135 B1
(45) Date of Patent: Mar. 17, 2009

(54) HISTOGRAM GENERATION WITH VECTOR OPERATIONS IN SIMD AND VLIW PROCESSOR BY CONSOLIDATING LUTS STORING PARALLEL UPDATE INCREMENTED COUNT VALUES FOR VECTOR DATA ELEMENTS

(76) Inventor: Tibet Mimar, 1040 Gloucester Ct., Sunnyvale, CA (US) 94087

( * ) Notice: Subject to any disclaimer, the term of this patent is extended or adjusted under 35 U.S.C. 154(b) by 676 days.

(21) Appl. No.: 10/441,352

(22) Filed: May 20, 2003

Related U.S. Application Data

(60) Provisional application No. 60/385,722, filed on Jun. 3, 2002.

(51) Int. Cl.
 *G06F 15/80* (2006.01)
(52) U.S. Cl. .......................................... 712/22; 712/7
(58) Field of Classification Search ............. 712/4, 712/7, 22, 222
 See application file for complete search history.

(56) References Cited

U.S. PATENT DOCUMENTS

| | | | | |
|---|---|---|---|---|
| 5,129,092 A | * | 7/1992 | Wilson | 712/16 |
| 6,393,413 B1 | * | 5/2002 | Jorgensen et al. | 706/20 |
| 2002/0110277 A1 | * | 8/2002 | Ono et al. | 382/168 |

* cited by examiner

*Primary Examiner*—Kenneth S Kim
(74) *Attorney, Agent, or Firm*—Sawyer Law Group LLP

(57) ABSTRACT

The present invention provides histogram calculation for images and video applications using a SIMD and VLIW processor with vector Look-Up Table (LUT) operations. This provides a speed up of histogram calculation by a factor of N times over a scalar processor where the SIMD processor could perform N LUT operations per instruction. Histogram operation is partitioned into a vector LUT operation, followed by vector increment, vector LUT update, and at the end by reduction of vector histogram components. The present invention could be used for intensity, RGBA, YUV, and other type of multi-component images.

5 Claims, 4 Drawing Sheets

REPLACEMENT SHEETS

HISTOGRAM GENERATION WITH VECTOR OPERATIONS IN SIMD AND VLIW PROCESSOR BY CONSOLIDATING LUTS STORING PARALLEL UPDATE INCREMENTED COUNT VALUES FOR VECTOR DATA ELEMENTS

CROSS REFERENCE TO RELATED APPLICATION

This application claims priority under 35 U.S.C 119(e) from co-pending U.S. Provisional Application No. 60/385,722 filed on Jun. 3, 2002 by Tibet Mimar entitled "Method for Parallel Histogram Calculation in a SIMD and VLIW Processor", the subject matter of which is fully incorporated herein by reference.

BACKGROUND OF THE INVENTION

1. Field of the Invention

The invention relates generally to the field of processor chips and specifically to the field of single-instruction multiple-data (SIMD) processors. More particularly, the present invention relates to vector Look-Up Table (LUT) and histogram operations in a SIMD processor.

2. Description of the Background Art

Histogram calculation for video and images has typically been performed as a scalar operation. For example, Imaging and Compression Engine (ICE) chip used by Silicon Graphics O2 workstation featured a 8-wide SIMD architecture was used to implement video and image library operations, but histogram was calculated one component at a time, even though ICE has a dual-instruction issue per-clock-cycle for concurrent I/O and ability to process 8 data in parallel. This resulted in the order of N*M clock cycles to calculate the histogram of N data entries with M components, where components are different colors such as Red, Green, Blue, and Alpha (RGBA).

It is also conceivable that image and video data could be partitioned into K groups, and each of these groups could be passed on to a different processor, or to a part of VLIW processor for concurrent calculation. For example, TI's TMS320C62X Image/Video Processing Library uses this technique, where this VLIW processor has 8 separate execution units. This code operates on four interleaved histogram bins, which are later summed together. The benchmark according to this library is 1158 cycles for L=512 data entries, or (9/8)*L+512 in general. This result is no better than order of L operations, despite 8-wide parallel VLIW architecture of 'C62X.

Image and video analysis, histogram equalization, auto focus, and other image enhancement algorithms use histogram calculation. If image has multiple components such as RGBA or YUV (luma and two chroma), different histogram bins are used for each component.

Part of the reason histogram has been limited to a scalar operation is that there was no support for its parallel implementation in a SIMD or VLIW processor.

SUMMARY OF THE INVENTION

The present invention uses vector LUT operations to calculate the histogram in parallel for multiple data points, resulting in a speed up by a factor of N in comparison with scalar calculation, where N is the number SIMD elements and LUT units provided.

For histogram calculation, N values of image/video are read, and vector LUT operation is performed on these components as addresses. Vector LUT does not require a separate dedicated memory, but uses part of the N separate data memory modules of the SIMD processor. For a LUT operation, each of the N memory modules are addressed independently using the corresponding input vector-register element value plus a base address as the address for a given SIMD vector slice. The vector LUT output contains the past occurrence-count values for each of these components. These occurrence values are incremented using a single vector add or increment operation, and then stored back to the vector LUT memory again, using the input vector values (the same input vector register into which input values were read) as the vector LUT addresses.

The present invention requires four vector instructions to perform histogram: input data read, vector LUT read, vector increment, and vector store back. This is exactly the same for scalar calculation of histogram, except histogram for N values are calculated simultaneously, thus, the histogram calculation speed up is by a factor of N. For a preferred embodiment of the present invention, the value of N is 16, i.e., 16 LUTs operating in parallel, and this results in a speed up by a factor of approximately 16×. In another preferred embodiment of the present invention, the value of N is 32, i.e., 32 LUTs operating in parallel, and this results in a speed up by a factor of approximately 32×. It will be appreciated by those of ordinary skill in the art that the invention is able to accommodate N having a range of values of being an integer between 8 and 512 and preferably up to 256.

BRIEF DESCRIPTION OF THE DRAWINGS

The accompanying drawings, which are incorporated and form a part of this specification, illustrated prior art and embodiments of the invention, and together with the description, serve to explain the principles of the invention.

DETAILED DESCRIPTION

In the following detailed description of the present invention, numerous specific details arc set forth in order to provide a through understanding of the present invention. However, it will be obvious to one skilled on the art that the present invention may be practiced without these specific details. In other instances well-known methods, procedures, components, and circuits have not been described in detail so as not to unnecessarily obscure aspects of the present invention.

The present invention features a method for providing vector histogram calculation operations in single-instruction multiple-data (SIMD) operations in a computer system that executes on a vector of N elements for each SIMD instruction. The histogram operation is calculated with SIMD parallelism using vector Look-Up Table (VLUT) and Vector increment operations.

The present invention leverages the well-proven RISC processor technology with the additional of a SIMD data path processor. The SIMD processor is a set of vector registers and execution units added to a regular RISC processor in an analogous manner to adding floating point unit to a RISC processor. The present invention has no program or data caches, and contains a small program and data memory. Furthermore, no stalls are allowed. This simplifies the design and the required silicon die area significantly.

For the preferred embodiment, in one implementation, the number of SIMD processing elements is chosen to be 16. This is because the H.264 video compression standard requires processing 4×4 blocks of pixels, which contain 16 pixel components. But the architecture is easily scalable between 8 and 64 processing elements. The invention is not so limited however.

Figure 1:
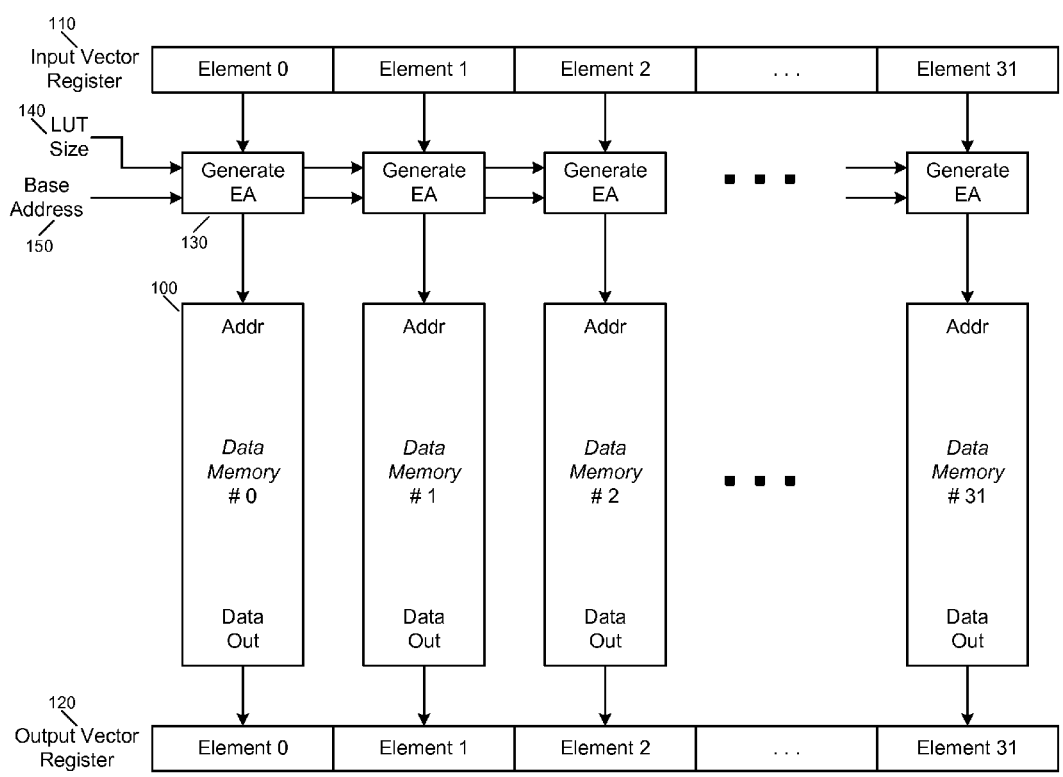
FIG. 1 illustrates the vector LUT operation using N-element vectors. The data memory is part of processor data memory, and is partitioned into N modules. This data memory is used for regular or vector operations as well as vector LUT operations.

A simple custom 16-bit processor is used as the RISC processor, as shown in FIG. 1. The function of this RISC processor is the load and store of vector registers for SIMD processor, basic address-arithmetic and program flow control. The overall architecture of Vector Processing Unit could be considered a combination of Long Instruction Word (LIW) and Single Instruction Multiple Data Stream (SIMD). This is because it issues two instructions every clock cycle, one RISC instruction and one SIMD instruction. SIMD processor can have any number of processing elements. RISC instruction is scalar working on a 16-bit data unit, and SIMD processor is a vector unit working on 16 16-bit data units in parallel.

The data memory is 256-bits wide to support 16 wide SIMD operations. The scalar RISC and the vector unit share the data memory. A cross bar is used to handle memory alignment transparent to the software, and also to select a portion of memory to access by RISC processor. The data memory is dual-port SRAM that is concurrently accessed by the SIMD processor and DMA engine. The data memory is also used to store constants and history information as well input as input and output video data. This data memory is shared between the RISC and SIMD processor.

While the DMA engine is transferring the processed data block out or bringing in the next 2-D block of video data, the vector processor concurrently processes the other data memory module contents. Successively, small 2-D blocks of video frame such as 64 by 64 pixels are DMA transferred, where these blocks could be overlapping on the input for processes that require neighborhood data such as 2-D convolution.

Vector processor, also referred to as SIMD, simply performs data processing, i.e., it has no program flow control instructions. RISC scalar processor is used for all program flow control. RISC processor also additional instructions to load and store vector registers.

Each instruction word is 64 bits wide, and typically contains one scalar and one vector instruction. The scalar instruction is executed by the RISC processor, and vector instruction is executed by the SIMD vector processor. In assembly code, one scalar instruction and one vector instruction are written together on one line, separated by a colon ":". Comments could follow using double forward slashes as in C++.

In general, RISC processor has the simple RISC instruction set plus vector load and store instructions, except multiply instructions. Both RISC and SIMD has register-to-register model, i.e., operate only on data in registers. RISC has the standard 32 16-bit data registers. SIMD vector processor has its own set of vector register, but depends on the RISC processor to load and store these registers between the data memory and vector register file.

The preferred embodiment performs 16 LUT operations in a processor having 256-bit wide data memory that is organized as 16 modules of on-chip memory, where each memory module is 16-bits wide. Although a data path of 256-bits and 16-vector elements is exemplified herein, the present invention is readily adaptable to other variations with different N values other than 16.

Figure 2:
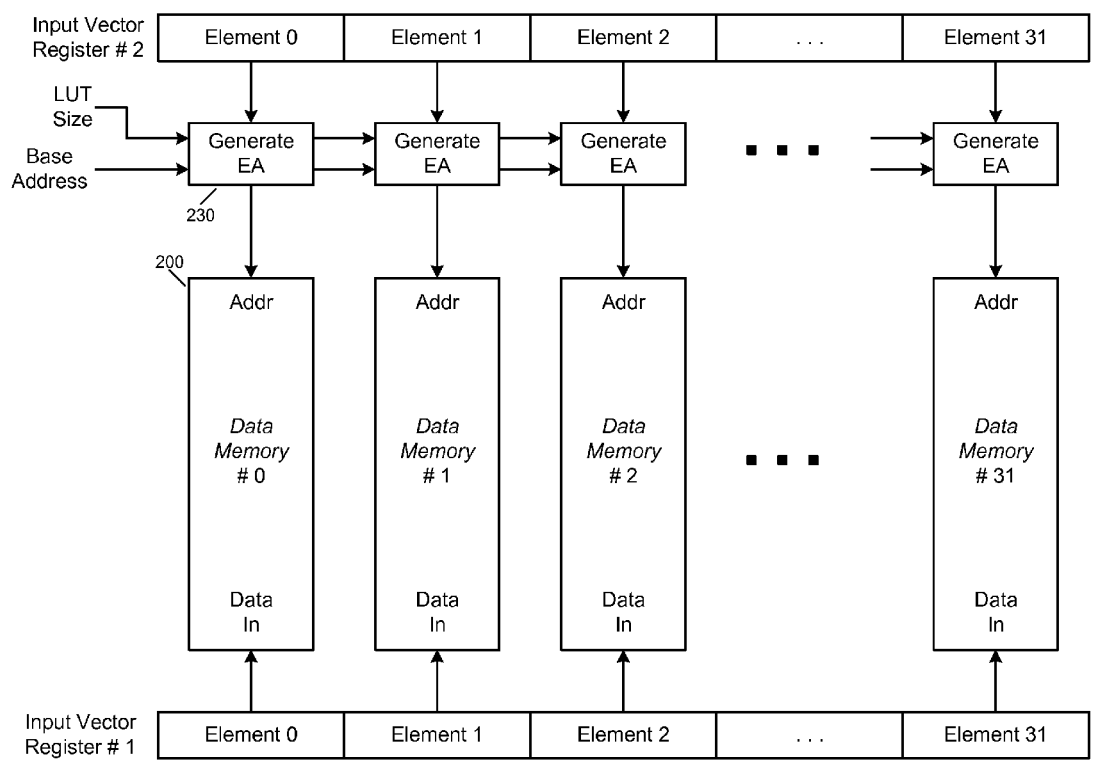
FIG. 2 illustrates vector LUT update operation, which writes input vector register elements to addressed elements of vector LUT memory specified by another vector register.

FIG. 2 provides a more detailed view of how data memory is divided into N memory modules. There are multiple reasons for dividing the data memory into N modules. The first reason is to be able to read a vector with any alignment with any memory alignment, which is outside the scope of the present invention. The second reason is to support the vector LUT operation. As shown in this figure the address inputs of the data memory could be selected either from a vector register output or from regular address unit for loading and storing vector registers to or from data memory.

Figure 3:
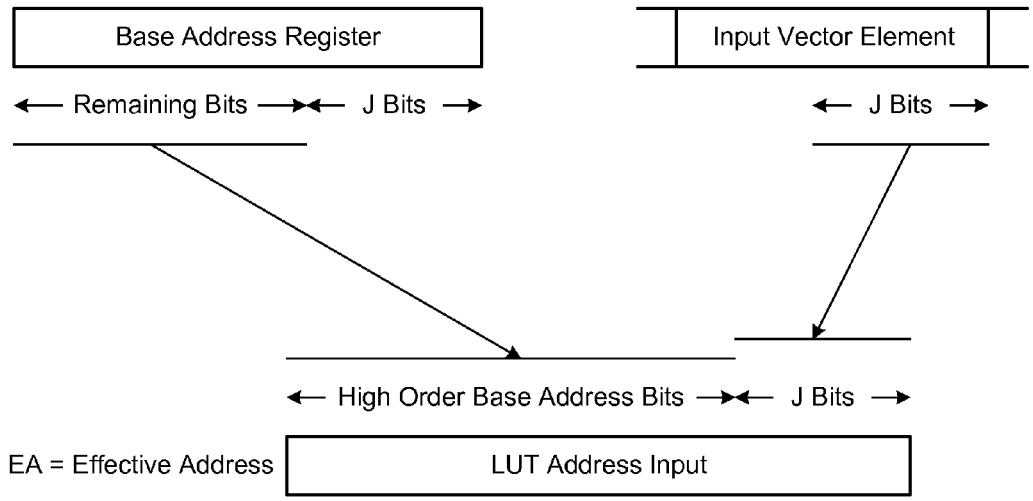
FIG. 3 illustrates the address calculation for each of the N LUT modules. The address is concatenation of global base address, which must be at power-of-two address boundary, and J least-significant data bits of input vector element for a given vector element.

FIG. 3 illustrates the vector LUT operation. Data memory 300 of the SIMD processor that is 32 elements wide is partitioned into 32 separate memory modules, each of which could be independently addressed for vector LUT operation. A vector register 310 that is 32 elements wide is used to generate the input address for the LUT operation, and the output of LUT from 32 data memories are stored into a vector register 320 that is 32 elements wide.

Figure 5:
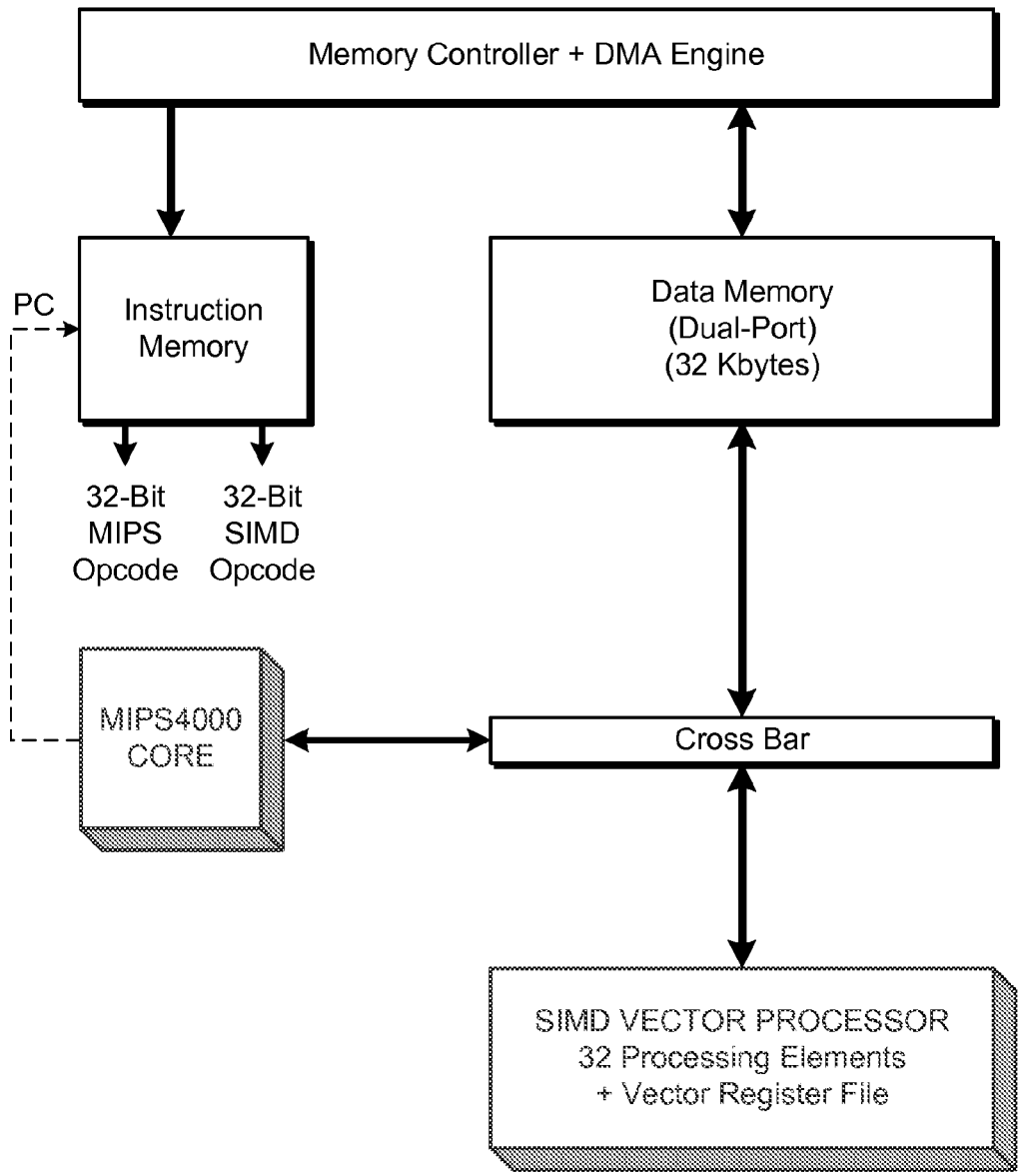
FIG. 5 illustrates the preferred embodiment of present invention where MIPS4000 RISC core is connected to vector SIMD processor. These two processors share the data memory.

The block to generate Effective-Address (EA) 320 takes the LUT size, base address, and generates effective address to be provided to each data memory module. There is a separate EA generation logic per each vector element. The effective-address is formed as concatenation of low-order J bits of a vector element value and high-order address bits specified by base address 350. The forming of address for each vector element is illustrated in FIG. 5, where LUT size is $2^J$ entries. Alternatively, base address could be added to each elements address, but the preferred embodiment uses concatenation of addresses in order not to require 32 adders for this operation. The only requirement is that the base address is on a boundary such that the addresses could be concatenated.

The LUT size 340 is determined for all the LUTs by the vector instruction as the number of address bits in a LUT. For example, eight is used for a 256 entry LUT. The base address 350 is determined by a register, which specifies the base of LUT in the data memory.

Table 1 shows the vector LUT instructions or the operations for the preferred embodiment. Load Vector LUT (LV-LUT) vector look-up table, instruction takes a source vector register, a RISC data register, and stores the LUT result in a destination vector register. All source and destination vector registers are part of a vector register file. The LUT size is specified as a constant as part of the instruction. RISC data register specifies the LUT base address in data memory. $LUT_J$ refers to $J^{th}$ data memory module.

TABLE I

Vector LUT Instructions and Operations for Histogram Calculation.

| Instruction | Description |
| --- | --- |
| LVLUT. <n> VRd, VRs(Rn) | Vector LUT Read Operation: Load N words from LUT into VRd. For element j = 0 to N-1 do the following: $VRd_j \leftarrow LUT_j(EA_j)$ $EA_j = (Base\ Address\ \&\ !1^n)\ \|\ (VRs_j\ \&\ 1^n)$ |
| SVLUT. <n> VRs-1, VRs-2(Rn) | Vector LUT Write Operation: Store N words into LUT. For element j = 0 to N-1 do the following: $LUT_j(EA_j) \leftarrow VRs\text{-}1_j$ $EA = (Base\ Address\ \&\ !\ 1^n)\ \|\ (VRs\text{-}2_j\ \&\ 1^n)$ VRs-1: Contains data to store. VRs-2: Contain LUT addresses to access. |

Figure 4:
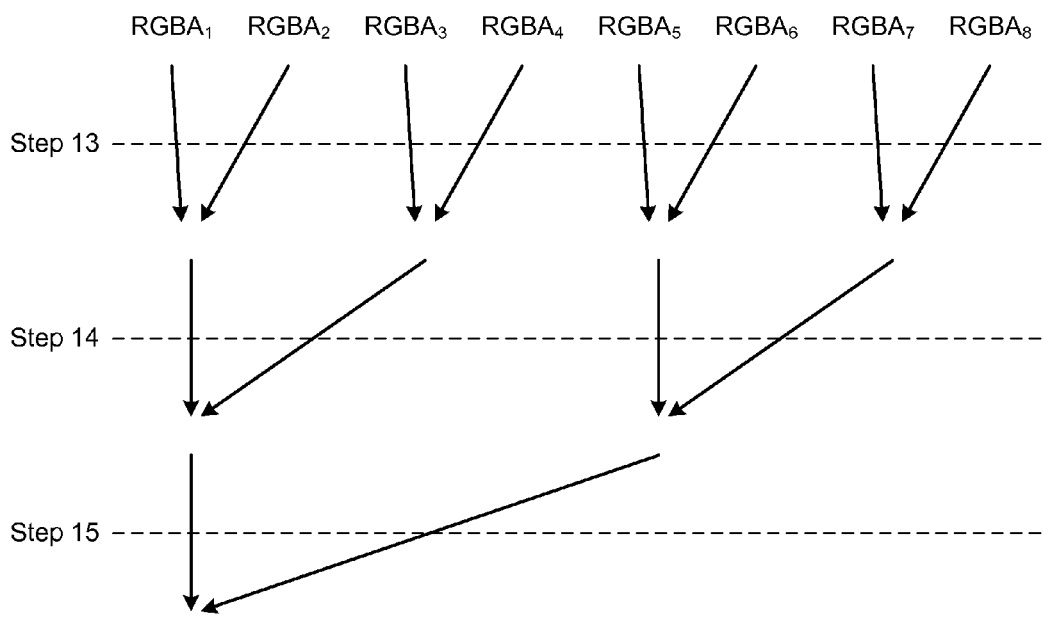
FIG. 4 illustrates reduction of partial histogram results for the case of RGBA input format and for N equals to 32 (32 wide SIMD.) Eight sets of RGBA histogram entries have to be summed together for the overall result. This is accomplished in three steps using three vector add instructions.

Notation:
Rn: Scalar RISC processor register.
VRd, VRs-1, VRs-2, and VRc: Vector registers.
!: Local Negation
‖: Concatenation
$1^n$: Binary one repeated "n" times.
&: Logical AND operation Store VLUT (SVLUT) instruction is used to write or update the contents of vector LUT. It requires source vector specify the LUT entries to write and the source vector register that contains the data to write. SVLUT uses the structure shown in FIG. 4. The only difference to FIG. 3 is that vector register contents are written into the LUT, i.e., data memories.

Histogram Calculation Details

The following steps are used for vector histogram calculation:

A. Set the LUT base address register to point to the beginning of histogram table to be stored in data memory.
B. Initialize the histogram table area in data memory to zeros. Using vector-write operations, with vector preloaded with zeros, speeds up this operation because it writes N elements in one instruction, e.g., 32 16-bit values in one vector store operation.
C. Read a vector of N input values into a vector register, and read the corresponding location for these entries using a vector LUT instruction, LVLUT into a vector register VRd.
D. Increment the elements of VRd using a vector addition instruction and adding one to all the elements, or using a vector increment instruction that does the same. This step increments the occurrence value for each of the input values that is read from histogram table.
E. Store the incremented VRd from the previous step back into the same entries using a vector LUT update instruction SVLUT. This updates the histogram table.
F. Repeat steps C through E for all the data points, processing N input data points at each step. When all the data points are processed, then go to step G.
G. Perform necessary vector reduction of vector table. For example, if input data is all in intensity values, then sum all 32 values of each LUT entry for calculating the histogram. If input data is in RBGA (Red-Green-Blue-Alpha) components, then sum each group of eight elements together for each LUT entry. Alpha values may be left out of addition depending upon the application.

Reduction of multiple histogram bins is illustrated in FIG. 6 for the case of video with {RGBA} components, i.e., four components per pixel. If there are 16 elements per vector, then this means there are four RGBA histogram bins per LUT entry.

The corresponding four components of these four bins have to be summed together. This could be done using tree of adders, which could be implemented as three vector addition instructions of SIMD.

Histogram calculations may be done with or without clamping when the total occurrences exceed the maximum LUT output value. For example, typically we would use a 256 entry LUT (i.e., 8-bit address) and where LUT output is 16-bits in certain situations and a 512 entry LUT and output of 32-bits in other situations. In a large image if there are more than 65,536 values, the histogram table entry could overflow and wrap-around, but this is allowed by openGL standard. If this is not allowed then, vector addition with saturation to maximum value has to be used.

The example code fragment to calculate the histogram is shown below. This code is the same regardless of the number of vector elements, i.e., the parallelism of the present invention. VR0 to VR31 are the vector registers of the SIMD processor and R0 to R31 are the registers of the RISC processor. LDV is the vector load instruction, VINC is the vector increment instruction, and "//" indicate comment fields.

```
//R1 → Input Data
//R2 → LUT Base Address
LDV     VR1, (R1);          //Read Input vector
LVLUT   VR2, VR1 (R2);      //Perform Vector LUT:
                            R1 ← Past Occurrence Count
VINC    VR2, VR2;           //Increment occurrence counts for all
                            elements
SVLUT   VR2, VR1 (R2);      //Write back updated counts to vector LUT
```

The reduction of multiple histogram bins could be done as a post processing of the whole LUT, or selectively for only the interested histogram entries.

Dual-Issue Architecture

The best way to implement the present invention is using at minimum a dual-issue processor, where during each clock cycle two instructions are issued: One scalar instruction and one vector instruction for SIMD operations, as shown in FIG. 5. SIMD has 32 vector elements, and each element is 16-bits wide. The scalar processor is a RISC type processor, and handles program flow as well as loading and storing of vector register file registers with special vector load and store instructions. The vector processor operates on vector register file. Using dual-port data memory modules will provide vector LUT operations concurrently with vector load and store instructions by the scalar unit. The data memory is shared by RISC and SIMD processors, and is also used for LUT operations. The data memory is internally partitioned into 32 modules. The data memory is dual-ported so that processing and concurrent DMA is supported.

I claim:

1. A system for performing histogram calculations in a Single-Instruction-Multiple-Stream (SIMD) processor for audio, video, 3-D graphics, and digital signal processing functions comprising:
   a. a program flow control unit coupled to the processor;
   b. a vector register file coupled to the program control flow unit which includes a set of vector registers, where each vector register comprises N vector elements;
   c. a data memory which is partitioned into N modules, wherein each of the N modules is independently addressed and a portion of data ports of the data memory are coupled to the vector register file;

d. a plurality of Look-Up Tables (LUTs), wherein each LUT corresponds to a respective module of the N modules, each LUT for storing count values;

e. a vector execution unit within the processor comprising N computing elements, each computing element corresponding to a respective LUT module, wherein for each computing element, the unit: (i) performs a vector element data read operation to provide an entry index for a LUT and perform an LUT read operation; (ii) increments each read LUT count value; and, (iii) stores back the respective incremented count value; and, wherein the output and inputs of vector execution unit are coupled to read and write ports of the vector register file;

f. a port of the vector register file selectively coupled to an address input of the data memory; wherein the processor performs a histogram operation; and, g. a histogram generation unit for adding the count values in the plurality of LUTs to generate a histogram table using vector arithmetic instructions.

2. The system of claim 1, wherein the SIMD processor performs operations on vectors in a single clock cycle using program instructions comprising:

a. setting a LUT base address register to point to a beginning point of a LUT to be stored in the data memory;

b. initializing a LUT module area in the data memory to zero;

c. reading a vector of N data values from a vector register and reading a corresponding location for each of the N LUT modules using the data values as the index address;

d. incrementing each read count value in the LUT by one, using vector arithmetic operations;

e. storing the incremented count value into its respective entry using a vector LUT update instruction, thereby updating the LUT; and f. adding the count values in the LUT modules together to provide the histogram table.

3. The system of claim 1 wherein histogram operation compromises:

a. initializing all LUT contents to zero by multiple vector write operations by scanning all LUT addresses;

b. loading input data into a vector register, and reading the input data to perform a vector Look-Up-Table read operation;

c. incrementing the count value read from the LUT by one as a means of updating LUT count values;

d. performing a vector LUT write operation by writing back updated LUT count values to the vector LUT pointed to by the vector register containing input data values; and, e. adding same type of LUT data for each histogram bins to reduce vector components by using vector arithmetic instructions.

4. The system of claim 3, wherein a RISC processor is used for input/output processing for scalar and vector values and for program flow control, and SIMD processing is used for data processing, whereby one RISC and one SIMD instruction are executed every clock cycle.

5. The system of claim 4, wherein the value of N is an integer ranging from 8 to 256.

* * * * *